(12) United States Patent
Yamada et al.

(10) Patent No.: US 10,459,613 B2
(45) Date of Patent: Oct. 29, 2019

(54) OBJECT DISPLAY DEVICE

(71) Applicant: KYOCERA Corporation, Kyoto (JP)

(72) Inventors: Takashi Yamada, Kanagawa (JP); Tomotake Aono, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 159 days.

(21) Appl. No.: 15/222,415

(22) Filed: Jul. 28, 2016

(65) Prior Publication Data

US 2016/0334976 A1 Nov. 17, 2016

Related U.S. Application Data

(63) Continuation of application No. 13/203,457, filed as application No. PCT/JP2010/001295 on Feb. 25, 2010, now abandoned.

(30) Foreign Application Priority Data

Feb. 25, 2009 (JP) ................. 2009-043201

(51) Int. Cl.
*G06F 3/0484* (2013.01)
*G06F 3/0488* (2013.01)
*G06F 3/041* (2006.01)
*G06F 3/0482* (2013.01)

(52) U.S. Cl.
CPC ........ *G06F 3/04845* (2013.01); *G06F 3/0414* (2013.01); *G06F 3/0482* (2013.01); *G06F 3/0488* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 5,694,150 A * | 12/1997 | Sigona | G06F 3/038 715/856 |
| 5,838,973 A | 11/1998 | Carpenter-Smith et al. | |
| 6,166,739 A | 12/2000 | Hugh | |
| 6,940,494 B2 | 9/2005 | Hoshino et al. | |
| 7,219,302 B1 | 5/2007 | O'Shaughnessy et al. | |
| 8,209,628 B1 * | 6/2012 | Davidson | G06F 3/0487 715/790 |
| 2003/0063073 A1 * | 4/2003 | Geaghan | G06F 3/0416 345/173 |
| 2004/0104894 A1 | 6/2004 | Tsukada et al. | |

(Continued)

FOREIGN PATENT DOCUMENTS

| | | |
|---|---|---|
| JP | 2004-021933 A | 1/2004 |
| JP | 2004-185258 A | 7/2004 |

(Continued)

OTHER PUBLICATIONS

Office Action dated Jan. 28, 2014 and issued by Japanese Patent Office for Japanese Patent Application No. 2009-043201.

*Primary Examiner* — Dorothy Harris
(74) *Attorney, Agent, or Firm* — Studebaker & Brackett PC

(57) ABSTRACT

An object display device is disclosed. An object display device includes a display unit, a detection unit and a control unit. The display unit is configured to display an object. The detection unit is configured to detect a location and a load of a pressing to the display unit. The control unit can control a movement of the object based on conditions of first and second pressings.

8 Claims, 11 Drawing Sheets

(56) References Cited

U.S. PATENT DOCUMENTS

| | | | |
|---|---|---|---|
| 2006/0132456 A1* | 6/2006 | Anson | G06F 3/0488 345/173 |
| 2006/0132457 A1* | 6/2006 | Rimas-Ribikauskas | G06F 3/04842 345/173 |
| 2007/0143354 A1 | 6/2007 | Morooka | |
| 2007/0192696 A1 | 8/2007 | Um et al. | |
| 2007/0229471 A1 | 10/2007 | Kim et al. | |
| 2008/0165153 A1 | 7/2008 | Platzer et al. | |
| 2008/0202823 A1 | 8/2008 | Won et al. | |
| 2008/0303797 A1 | 12/2008 | Grothe | |
| 2009/0058830 A1* | 3/2009 | Herz | G06F 3/044 345/173 |

FOREIGN PATENT DOCUMENTS

| | | |
|---|---|---|
| JP | 2005-196810 A | 7/2005 |
| JP | 2006-099733 A | 4/2006 |
| JP | 2008-146241 A | 6/2008 |
| JP | 2008-262405 A | 10/2008 |

\* cited by examiner (A)

(B)

(a)

(b)

State 1
Press object location at the condition
of 0 < Pressure load < threshold value
→ Object-specified state
(S11)

State 2
Pressing load ≥ Threshold
value → Execute object
(S12 Yes → S13)

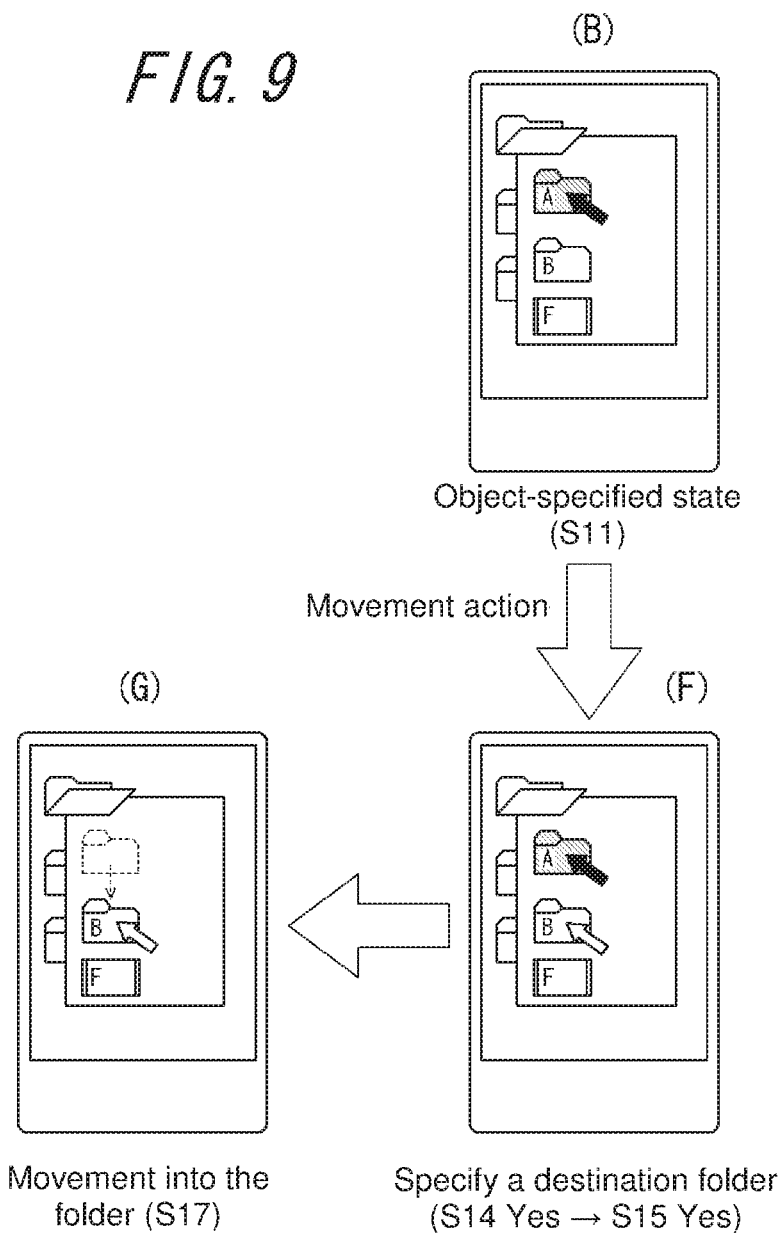

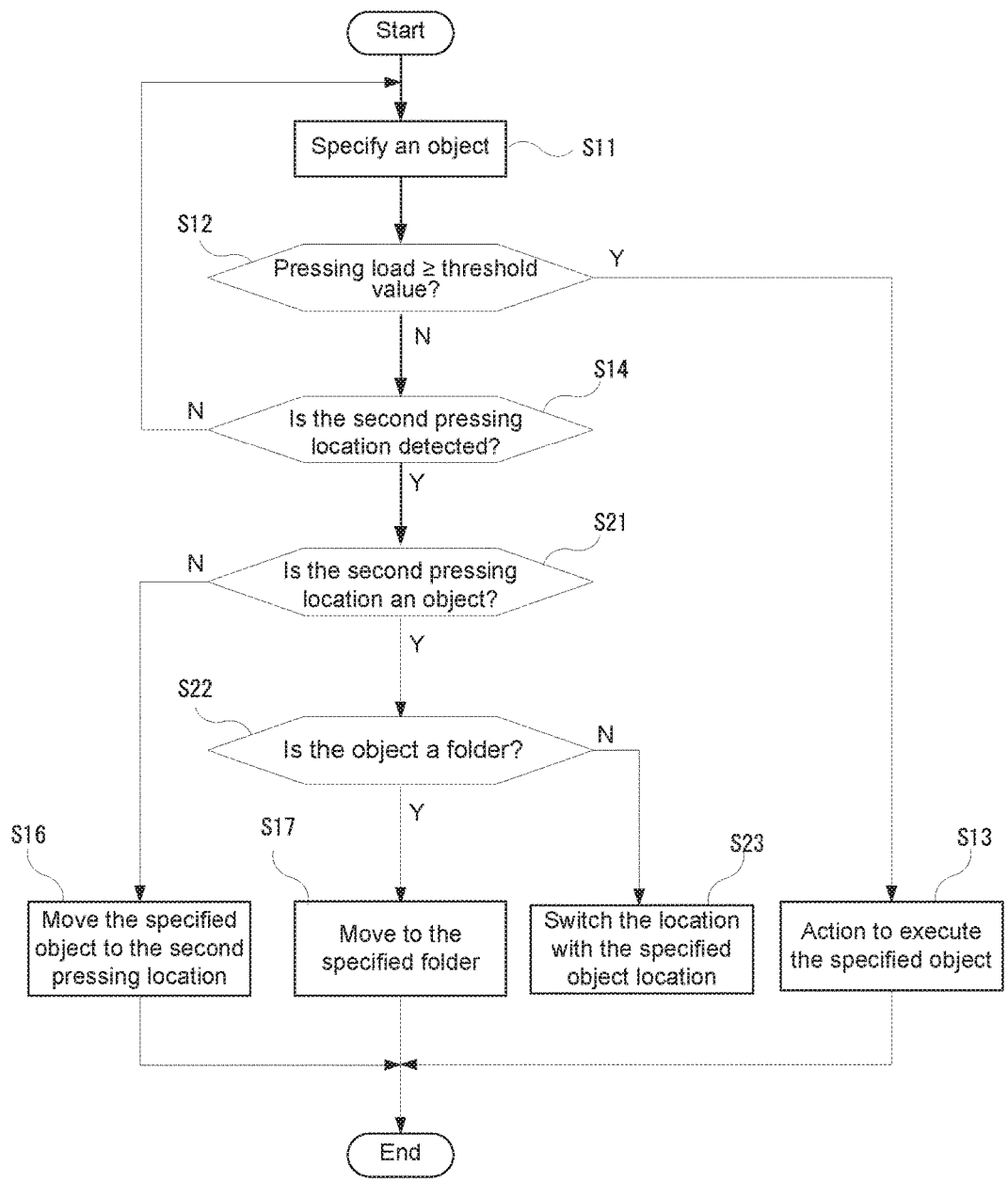

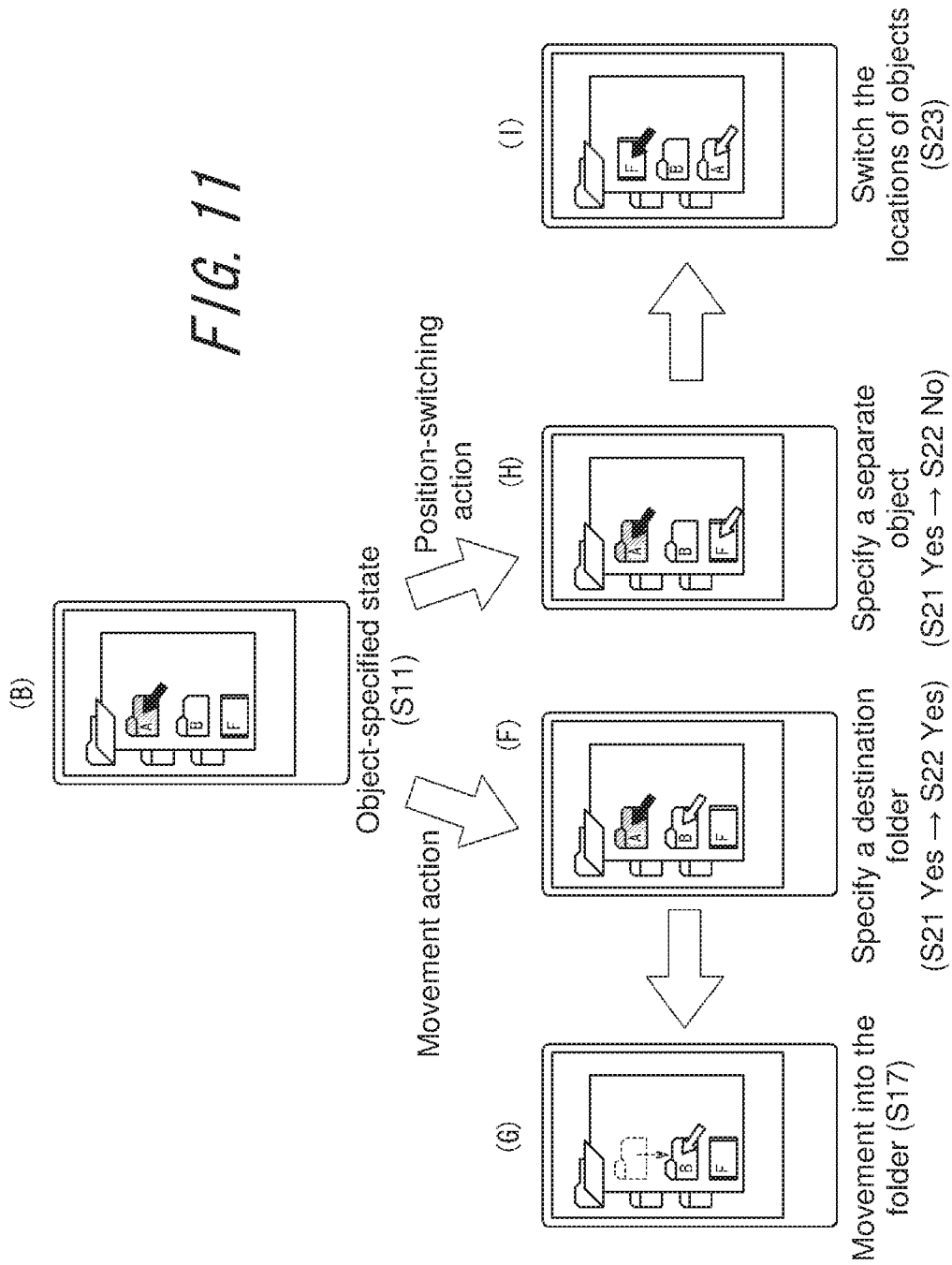

OBJECT DISPLAY DEVICE

CROSS REFERENCES

The present application claims the priority rights of Japanese Patent Application No. 2009-043201 filed on Feb. 25, 2009, and incorporates herein the entire disclosure of the application for reference.

TECHNICAL FIELD

The present invention relates to an object display device and particularly relates to a device on which a user can operate an object displayed on a display unit of a touch panel by performing an operation input with respect to the object.

BACKGROUND ART

In general, an aspect of operation inputs with respect to a personal computer (from hereon, simply referred as "PC") varies depending on an application program to be used (from hereon, simply referred as "application"). However, as a result of development of a graphical user interface (GUI), many applications have been designed to conduct intuitive operation inputs. Moreover, operation inputs are conducted on a desktop displayed on the display device of PCs with respect to icons of files, folders or the like. It is often the case that the operation inputs can be conducted by a common, intuitive operation even if different applications are used.

Conventionally, operation inputs for PCs have often been performed exclusively by using an input device, such as a keyboard or a mouse and clicking various icons for folders, files and the like (hereinafter, referred as "object") displayed on a display device. However, recently, there are also many devices allowing such operation inputs for PCs to be performed highly intuitively by using a display device including a touch panel. When performing an operation input to various objects, such as various folders, files and the like, displayed on a screen by using a touch panel, instead of performing a click operation using an input device, such as a mouse and the like, generally, a (touch) operation in which the touch panel is touched with a fingertip is performed. In addition to the fingertip of the user, touch panel operations may be performed through touch operations using a pen-type device, such as a stylus.

Recently, touch panels are being loaded on mobile terminals such as cell phones, small laptop PCs and PDAs (Personal Digital Assistants), and the various functions of such mobile terminals are becoming highly diversified and sophisticated. As a result, operations similar to the operation inputs for PCs described above are also becoming available on mobile terminals that include a touch panel. In other words, by performing operation inputs by touching a touch panel loaded on a mobile terminal with their fingertip, users are able to operate folders and files displayed on the display unit of a touch panel.

In the currently dominant types of operating systems (OSs), almost all file systems have a hierarchical structure composed of directories. In other words, various data or programs can be managed as various files, and such files can be included in a single folder, and that folder can be included in another folder at a higher level. Multiple files and/or other folders can also be included in a single folder. By using the hierarchical structure of such folders, users can classify and store information very efficiently. It is also easy for users to reorganize information that has already been stored in accordance with their preferences. In particular, in basic applications of the currently dominant types of OSs, the operability and convenience for the users has been improved significantly through the use of GUIs that visualize folders and files as objects.

Generally, when operating a folder or a file in a PC, a user performs a single-click or double-click operation on an object of a folder or a file by using an input device such as a mouse. By single-clicking an object of a folder or a file, the user can select the object. In the case of a folder with a hierarchical structure, the user can perform an operation to open that folder by double-clicking the object of the folder. Through such operations for opening folders, it is possible to display other folders and/or files included in the lower hierarchy of the folder. In the case of an object of a file, the user can execute the file by double-clicking the object. Each file is associated with the applications required for executing the file, and when a specific file is executed, applications required for executing the file are launched.

In addition to the PC operations described above, when moving the location at which an object for a folder or a file is displayed on a display device, the user can place the object for a folder or a file in a hold state (selected state) by maintaining a state in which the object is clicked. In this hold state, by moving the input location of the input device such as mouse while maintaining the hold state, the user can cause the location of the object to follow the movement of the input location of the input device. By moving the location of the object to a desired location using the input device while maintaining the hold state, and then releasing the clicked state at the desired location to release the hold state, the user can determine the location of the object. Generally, the operation of moving an object while maintaining a hold state is referred to as a "drag" operation, and the operation of releasing the hold state and determining the location of the object that has been moved in the hold state is referred to as a "drop" operation. This series of operations is also referred to as a "drag-and-drop" operation.

The "single-click", "double-click", "drag" operation and "drop" operation described above are not performed exclusively using a input device, such as mouse, as part of PC operations, and they may also be performed using a mobile terminal that includes a touch panel. In this case, a single-click on the touch panel is performed through an operation in which the user touches the touch panel once with their fingertip, and a double-click is performed through an operation in which the user quickly touches the touch panel twice consecutively with their fingertip. To perform a drag operation on the touch panel, the user keeps an object displayed on the touch panel in a hold state in which the object is touched (pressed) by their fingertip, and moves (tracing) their fingertip while pressing the touch panel. To perform a drop operation on the touch panel, after moving the object through a drag operation, the user releases the fingertip from the touch panel to release the hold state.

Through operations such as those described above, even when operating a terminal that includes a touch panel, the user is able to perform operation inputs similar to PC operations performed with an input device such as mouse. Because such easy and intuitive operation inputs can be performed, the use of terminals, such as mobile terminals, that include a touch panel has been increasing in recent years.

Touch panels included in conventional mobile terminals have generally included only functions for performing location detection to determine the location being touched by the fingertip of the user. However, recently, there have been proposals for touch panels that detect not only the location being touched on the touch panel, but also the pressing force to touch the touch panel (see Patent Document 1, for example).

This input device described in the Patent Document 1 measures the pressing force used on a touch panel when an object on the display unit of the touch panel is touched and specified by a user, and if the pressing force exceeds a prescribed value, a prescribed process is performed. In other words, this input device measures the pressing force of a pressing input performed by a user in relation to a keyboard screen displayed on a display unit, and if the pressing force is equal to or below a prescribed value, the display information of a prescribed range including the key specified on the keyboard screen is obtained and can be displayed at a display region at a location different from the keyboard screen. If the pressing force of the pressing input exceeds a prescribed value, this input device obtains information on the key corresponding to the location of the pressing input and can perform the input process of the key or a process to execute a program associated with the key.

RELATED ART

Patent Document

Patent Document 1: Japanese Unexamined Patent Application Publication No. 2004-21933

SUMMARY OF THE INVENTION

Problems to be Solved by the Invention

The following is a study on cases in which operations such as those described above, that is, operations in which the user moves a file or a folder through a "drag" operation before performing an operation to open a folder or execute a file, are performed as a series of actions using an input device that includes a touch panel. In this case, in methods using a conventional touch panel that detects only location (and does not detect pressing force), as described above, the user must first determine the location of the object by performing a drop operation after performing a drag operation of the object of a file or a folder. Then, the user is able to open the folder or execute the file by performing a single-click or a double-click of the file or folder.

In contrast, if using an input device that uses the touch panel with a pressing-force detection function described in Patent Document 1, the user is able to perform an operation to strongly press into an object directly after performing a drag operation of the object of a file or a folder. Such an operation to strongly press into an object can be associated with operations to open a folder or execute a file. Through the detection of the input location as well as the detection of the pressing force on the touch panel, it is possible to perform operations to open a folder or execute a file easily and swiftly as a series of actions after moving the object of a file or a folder.

However, to enable a user to perform such operations using an input device that includes a touch panel with a pressing-force detection function, as the basis for performing actions to open a folder or execute a file, it is necessary to preliminarily set a threshold value for the pressing force used to press the object. When performing a drag operation in a state in which a threshold value has been set for the pressing force, the user must perform a pressing input and maintain the pressing force, such that the pressing force used to press the touch panel does not satisfy the prescribed threshold value. Consequently, if an operation is performed with an unstable pressing force, actions that are not desired by the user may be performed.

While the user is performing a drag operation of an object, for example, if the pressing force satisfies the threshold value due to an inaccurate adjustment of the pressing force, actions to open the folder or execute the file under the drag operation will be performed against the user's intention. If an unintended action is performed, the user must cancel the action or redo the operation. When the user is performing a drag operation of an object, if the user loses control and releases the fingertip performing the drag operation from the touch panel, normally, this is recognized as a drop operation, and the location of the object is determined. In this case, the user must restart the interrupted drag operation of the object. The performance of actions unintended by the user is very bothersome for the user and wastes time and labor.

Generally, when a drag operation is being performed, because the user continually moves their fingertip, the pressing force is likely to vary by increasing and decreasing. Therefore, even if the user believes that they are performing a drag operation while holding an object with a pressing force that does not satisfy a prescribed threshold value, there is a concern that the pressing force may unintentionally become stronger and cause a file to be executed. Conversely, there is also a concern that the pressing force may unintentionally become weaker and cause the hold state to be released.

Particularly in the case of a small terminal such as a mobile terminal, users often perform operations while moving. When an input device that includes the touch panel with a pressing-force detection function described above is used in such a mobile terminal, it is likely to become more difficult to perform a stable drag operation while holding an object with a pressing force that does not satisfy the prescribed threshold value.

Therefore, an objective of the present invention designed in view of such a situation is to provide an object display device capable of moving objects accurately and promptly without using drag operations on a touch panel.

Means for Solving the Problems

According to a first aspect of the invention to achieve the above objective, an object display device comprises: a display unit displaying an object; a location detection unit detecting a location of a pressing to the display unit; a load detection unit detecting a pressing load to the display unit; and a control unit controlling the display unit such that, when the location detection unit detects a location of a first pressing corresponding to a location of the object and the load detection unit detects a load unsatisfying a threshold to execute an operation linked to the object, the object moves to a location corresponding to the location of the second pressing if the location detection unit detects a location of a second pressing different from the location of the first pressing.

According to a second aspect of the invention, in the object display device according to the first aspect of the invention, the control unit further controls the display unit such that the object corresponding to the location of the first pressing moves to a location corresponding to the location of the second pressing if the location of the second pressing corresponds to a location at which the object is not displayed on the display unit.

According to a third aspect of the invention, an object display device comprises: a display unit displaying an object; a location detection unit detecting a location of a pressing to the display unit; a load detection unit detecting a pressing load to the display unit; and a control unit controlling the display unit such that, when the location detection unit detects a location of a first pressing corresponding to a location of the first object displayed on the display unit and the load detection unit detects a load unsatisfying a threshold value to execute an operation linked to the first object, if the location detection unit detects a location of a second pressing corresponding to the second object and if the location of the second pressing is different from the location of the first pressing, the location of the first object and the location of the second object are switched.

According to a fourth aspect of the invention, in the object display device according to the first aspect of the invention, the control unit further controls the display unit such that the location of the first object and the location of the second object are switched if the second object is an object of a file other than a folder.

According to a fifth aspect of the invention, an object display device comprises: a display unit displaying an object; a location detection unit detecting a location of a pressing to the display unit; a load detection unit detecting a pressing load to the display unit; and a control unit controlling the display unit such that, when the location detection unit detects a location of a first pressing corresponding to a location of a first object displayed on the display unit, and the load detection unit detects a load unsatisfying a threshold to execute an operation linked to the first object, if the location detection unit detects a location of a second pressing corresponding to a second object which is different from the first object and is an object of a folder with a hierarchical structure, the first object moves to the hierarchy under the folder which is the second object.

According to a sixth aspect of the invention to achieve the above objective, an object display device comprises: a display unit displaying an object; a location/load detection unit detecting a location and a load of a pressing to the display unit; and a control unit controlling the display unit such that, when the location/load detection unit detects a location of a first pressing corresponding to a location of the object and detects a load unsatisfying a threshold to execute an operation linked to the object, the object moves to a location corresponding to the location of the second pressing if the location/load detection unit detects a location of a second pressing different from the location of the first pressing.

According to a seventh aspect of the invention, in the object display device according to the sixth aspect of the invention, the control unit further controls the display unit such that the object corresponding to the location of the first pressing moves to a location corresponding to the second pressing if the location of the second pressing corresponds to a location at which the object is not displayed on the display unit.

According to a eighth aspect of the invention, an object display device comprises: a display unit displaying an object; a location/load detection unit detecting a location and a load of a pressing to the display unit; and a control unit controlling the display unit such that, when the location/load detection unit detects a location of a first pressing corresponding to a location of a first object displayed on the display unit and detects a load unsatisfying a threshold to execute an operation linked to the first object, if the location/load detection unit detects a location of a second pressing corresponding to a location of second object different from the first object, the location of the first object and the location of the second object are switched.

According to a ninth aspect of the invention, in the object display device according to the eighth aspect of the invention, the control unit further controls the display unit such that the location of the first object and the location of the second object are switched if the second object is an object of a file other than a folder.

According to a tenth aspect of the invention, an object display device comprises: a display unit displaying an object; a location/load detection unit detecting a location and a load of a pressing to the display unit; and a control unit controlling the display unit such that, when the location/load detection unit detects a location of a first pressing corresponding to a location of a first object displayed on the display unit and detects a load unsatisfying a threshold value to execute an operation linked to the first object, if the location detection unit detects a location of a second pressing corresponding to a second object which is different from the first object and is an object of a folder having a hierarchical structure, the first object moves to the hierarchy below the folder which is the second object.

Advantage of the Invention

In an object display device according to the present invention, when a first pressed location corresponding to the location of an object is detected while a load not satisfying a threshold value for executing a process linked to the object has been detected, if a second pressed location is detected, the object is moved to the second pressed location. Therefore, the object display device of the present invention is capable of moving an object accurately and promptly without conducting a drag operation in which a pressing load is likely to change. Thus, the object display device is capable of reducing errors due to load change and enhancing its operability.

BRIEF DESCRIPTION OF THE DRAWINGS

FIG. 9 is a diagram illustrating an action based on a process according to the first embodiment.

FIG. 10 is a flow diagram showing a movement process of an object according to a second embodiment.

FIG. 11 is a diagram illustrating an action based on a process according to the second embodiment.

EMBODIMENT OF THE INVENTION

Hereinafter, each embodiments of the present invention is described with reference to drawings. In each embodiment hereinafter, as an example of an object display device of the present invention, a mobile terminal with a touch panel, such as a mobile phone and PDA, is described. However, the object display device is not limited to a mobile terminal, but is applicable to any arbitrary input device comprising a touch panel such as an ATM at a bank, a ticketing machine at a station and the like. In the present invention, an object display device refers an electric device displaying an object on a display unit thereof. Examples of the object display devices may include personal computers or laptop computers displaying an object on a display unit thereof, small laptop computers, PDA's, cell phones and the like.

(First Embodiment)

Figure 1:
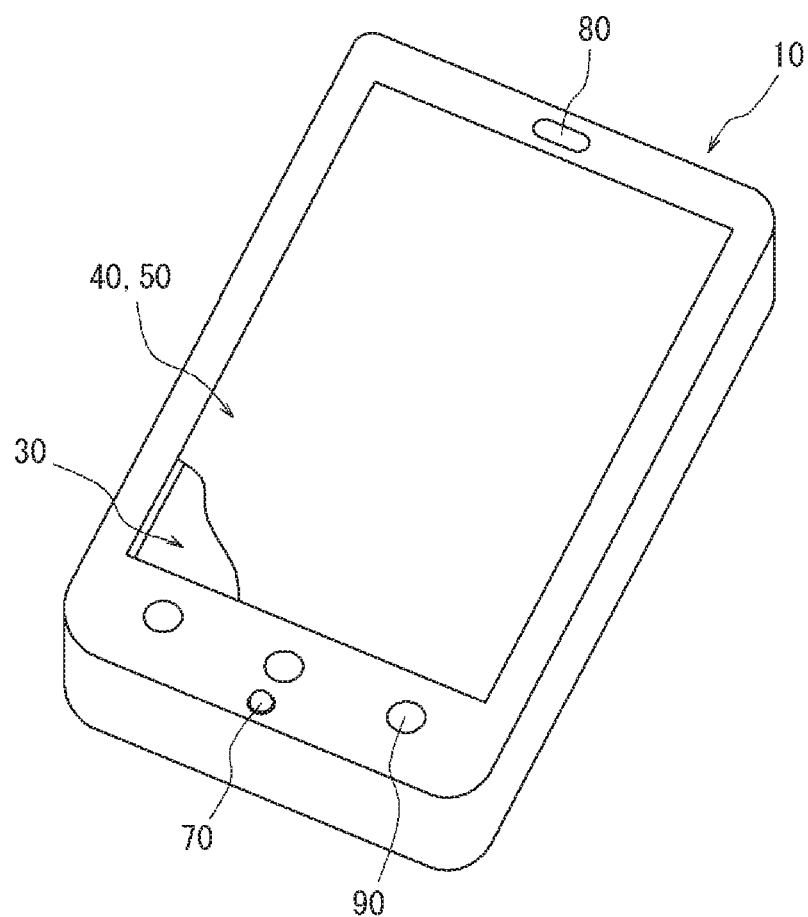
FIG. 1 is a perspective view showing an exterior of an object display device according to a first embodiment of the present invention.

FIG. 1 is a perspective view schematically showing an exterior of a general configuration of a mobile terminal 10 as an example of an object display device according to a first embodiment of the present embodiment. As shown by cutting out a portion, the mobile terminal 10 includes a display unit 30 at the front face of the terminal main body. The display unit 30 includes a liquid crystal display (LCD), an organic EL display or the like and displays a variety of information and an arrangement of keys and buttons by drawing shapes of the keys and the buttons. Furthermore, a location detection unit 40 and a load detection unit 50 are located on the front face of the display unit 30. The location detection unit 40 includes a matrix switch or the like which receives pressing inputs by a finger of a user or a stylus. The load detection unit 50 is located at a back face of the location detection unit 40. The load detection unit 50 includes a pressure detection element such as a strain gauge, a piezoelectric element, or the like to detect a pressing load by a user's finger or the like.

In the present embodiment, the display unit 30, the location detection unit 40 and the load detection unit 50 inclusively constitute a touch panel. An example of a specific configuration of the touch panel is described later. The mobile terminal 10 further includes a voice-input unit 70 consisting of a microphone and the like, a voice-output unit 80 consisting of a speaker and the like, and a key-input unit 90 consisting of at least one mechanical key. In addition, the mobile terminal 10 may include a digital camera function part, a one-segment broadcasting tuner, a short-range radio communication part such as an infrared communication function part and various interfaces and the like depending on a necessary function, but the drawings and the detailed descriptions are omitted.

Figure 2:
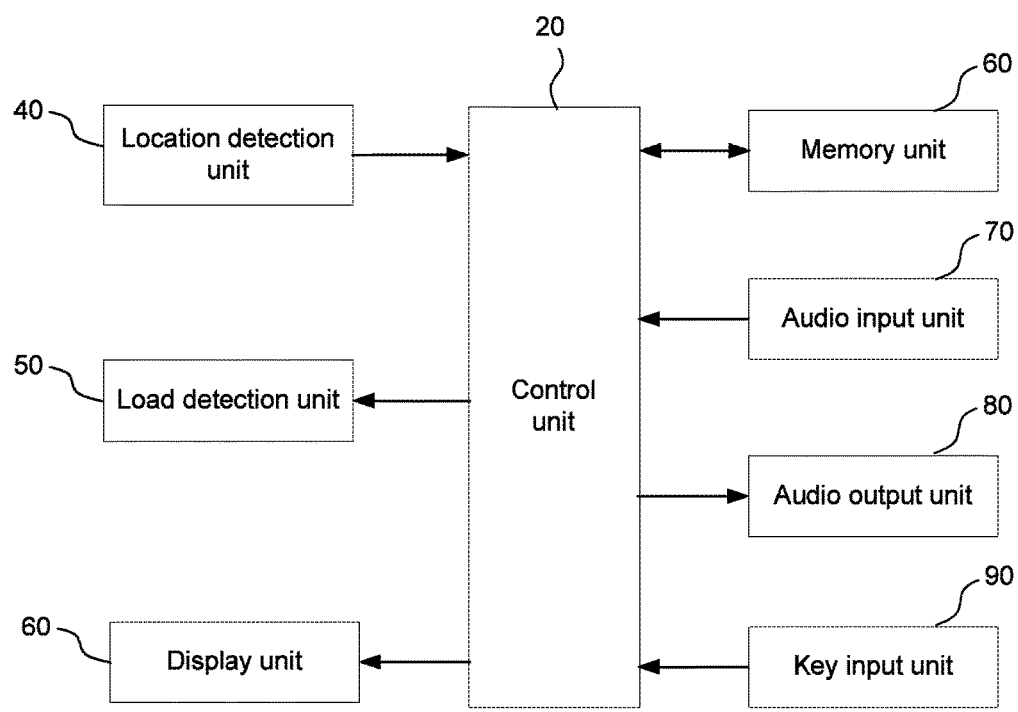
FIG. 2 is a block diagram showing a general functional configuration of a object display device according to the first embodiment.

FIG. 2 is a block diagram schematically showing an internal functional configuration of the mobile terminal 10 according to the present embodiment. The mobile terminal 10 includes a control unit 20, a display unit 30, a location detection unit 40, a load detection unit 50, a storage unit 60, a voice-input unit 70, a voice-output unit 80 and a key-input unit 90 as shown in FIG. 2. The control unit 20 controls and manages the entire mobile terminal 10 including each function block of the mobile terminal 10. In particular, in the present embodiment, it is described in details that the control unit 20 controls the display unit 30. The display unit 30 displays images, such as operation keys and buttons, and characters or a string of characters prompting a user to input. The location detection unit 40 is arranged, in an overlapping manner, on the front face of the display unit 30. Thus the location detection unit 40 receives a user's pressing input (pressing) with respect to the display unit 30 and detects the location of the pressing input. With such a configuration, the location detection unit 40 receives the pressing input with respect to the display unit 30 by a user, and the display unit 30 displays a variety of information such as input result in response to each application.

Specifically the location detection unit 40 detects (receives) an input from the contact (pressure) of the fingertip of the user or a stylus, etc. and outputs a signal corresponding to the location at which the input caused by the contact was detected on the location detection unit 40. The location detection unit 40 is configured by using, for example, a resistive film system or a capacitance system. In addition to performing displays corresponding to each application, the display unit 30 illustrates and displays, in a prescribed display region, a user interface configured by various keys and buttons for receiving pressing inputs made by the user on the display unit 30. Furthermore, the display unit 30 also displays icons of folders or files to be used in operations for applications and basic software. Hereinafter, in this manner, when the location detection unit 40 detects pressing inputs from a user with respect to the display unit 30, images such as various keys and buttons, icons of folders or files and the like to be displayed on the display unit 30 are simply described as "object."

The load detection unit 50 detects the load of the pressure exerted by the user on the display unit 30, and is configured with, for example, strain gauge sensors or piezoelectric elements. Examples of specific configurations including the load detection unit 50 as well as the location detection unit 40 and the display unit 30 described above are described below. The storage unit 60 stores various applications, various input information and the like and functions as a work memory and the like. Furthermore, the storage unit 60 also stores a plurality of templates including various kinds of objects to be used in accordance with each application.

The voice-input unit 70 converts the voice of a user to input signals and sends the input signals to the control unit 20. The voice output unit 80 converts the voice signals received from the control unit 20 to voice and outputs the voice. The key input unit 90 sends a corresponding signal to the control unit 20 according to the operation input from the user. The usage and the function are provided for various keys constituting the key input unit 90 in accordance with the application to be used. Since publicly known technologies can be used for these, more detailed description is omitted.

Next, specific configurations of a touch panel configured by including the display unit 30, the location detection unit 40 and the load detection unit 50 described above will be described using several examples.

Figure 3:
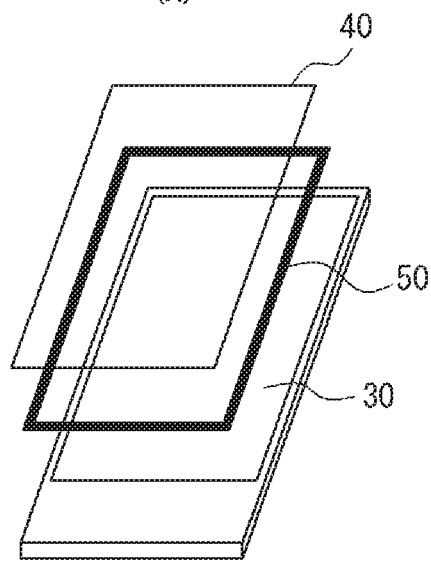
FIG. 3 is a diagram schematically illustrating the configuration of a touch panel of the object display device according to the first embodiment.
Figure 3:
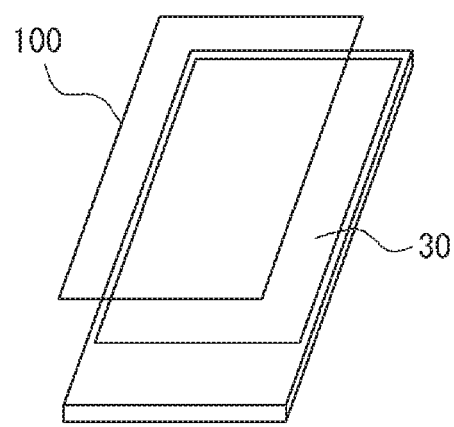

FIG. 3 is a diagram that schematically shows the configuration of the display unit 30, the location detection unit 40 and the load detection unit 50 of the mobile terminal 10 shown in FIG. 2. FIG. 3(A) is a diagram showing an example of the most basic configuration of a touch panel configured using multiple sensors according to the present invention. The display unit 30 displays objects of files and folders so that they can be visually acknowledged by the user. The frame-shaped load detection unit 50 is layered and arranged on the front surface of the display unit 30, along the outer circumference of the display region of the display unit 30.

Figure 4:
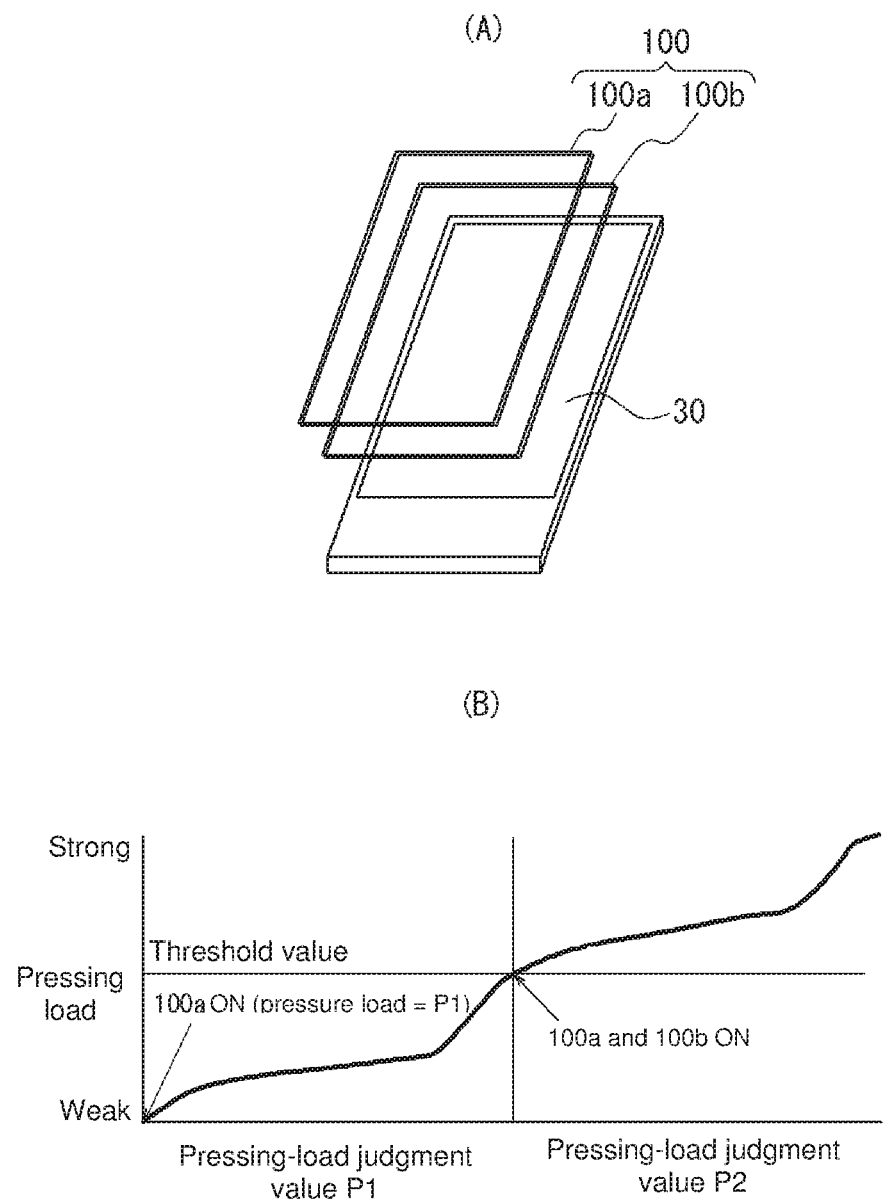
FIG. 4 is a diagram schematically illustrating another configuration of a touch panel of the object display device according to the first embodiment.

The load detection unit 50 detects the pressure load when the user presses the display unit 30. For the elements used in the load detection unit 50, pressure detection elements such as strain gauges or piezoelectric elements are used. Above the load detection unit 50, the location detection unit 40 is also layered and arranged. The location detection unit 40 detects the pressure location when the user presses the display unit 30. For the elements used in the location detect unit 40, resistive touch sensors or capacitive touch sensors are used. In this case, a material configured with, for example, a transparent film is used for the location detection unit 40 to ensure that the display of the display unit 30 can be viewed from outside even when the location detection unit 40 is layered and arranged. FIG. 3 and FIG. 4 shown later are schematic diagrams clearly showing the positional relationships of the members configuring the touch panel according to the present invention, and attention should be paid to the fact that in reality, each member configuring the touch panel is actually arranged more closely than shown in the diagram.

FIG. 3(B) is a diagram showing another exemplary configuration of the touch panel according to the present invention. FIG. 3(B) is a diagram showing the configuration in a case in which a member that doubles as the location detection unit 40 and the load detection unit 50 is used in the configuration shown in FIG. 3(A). By using the location/load detection unit 100 that combines the location detection unit 40 and the load detection unit 50, the structure of the touch panel can be simplified compared to the structure shown in FIG. 3(A). In this case, the location/load detection unit 100 detects the pressure location and load exerted on the display unit 30. Consequently, in the present embodiment, the location/load detection unit 100 configures a location/load detection unit. For the location/load detection unit 100, a multilayer resistive-film touch panel is used.

FIG. 4 is a diagram showing one example of the configuration of a touch panel using a member (the location/load detection unit 100) doubling as the location detection unit 40 and the load detection unit 50 shown in FIG. 3(B). In the example shown in FIG. 4(A), the location/load detection unit 100 is configured with two layers: a location/load detection unit 100a and a location detection/load detection unit 100b. In this case, both the location/load detection unit 100a and the location detection/load detection unit 100b use a resistive-film touch panel configured by two layers.

The layer on the upper side (the surface side) of the location/load detection unit 100a, which is the first touch panel, is the surface that directly receives external pressure from the finger of the user as shown in FIG. 4(A). In order to make the display of the display unit 30 visible, the material configuring the layer on the upper side of the location/load detection unit 100a, as well as the layer on the lower side (rear-surface side), is a transparent film, for example. The layer on the upper side (surface side) of the location/load detection unit 100b, which is the second touch panel, is also configured by a transparent film, and the layer on the lower side (rear-surface side) is configured by a transparent film or transparent glass. In this case, the layer on the lower side of the location/load detection unit 100b is configured to be fixed to the external housing of the mobile terminal 10, and each layer above this layer is able to detect external pressure from the finger of the user. In other words, in response to pressing force (pressure load) from external pressure caused by the finger of the user, the transparent film configuring the layers on the upper and lower sides of the location/load detection unit 100a, as well as the transparent film configuring the layer on the upper side of the location/load detection unit 100b respectively sag (are strained) slightly, and this sagging (strain) is detected.

FIG. 4(B) is a graph showing how the touch panel with the structure shown in FIG. 4 (A) detects a pressure location and a pressure load satisfying the prescribed threshold. The y-axis of the graph of FIG. 4(B) shows the load of the external pressure caused by the finger of the user, which is detected by the touch panel with the structure shown in FIG. 4(A). The x-axis of the graph shows the passage of time. In other words, the curve shown in FIG. 4(B) shows one example in which the external pressing force caused by the finger of the user gradually increases over time.

As can be seen in the touch panel structure shown in FIG. 4(A), when the surface of the location/load detection unit 100 is pressed from outside by the finger of the user, the transparent film configuring the layer on the upper side of the location/load detection unit 100a, which is the first touch panel, sags (is strained). When the sagging (strain) of this layer on the upper side comes into contact with the transparent film configuring the layer on the lower side of the location/load detection unit 100a, the location/load detection unit 100a, which is the first touch panel, is considered to be turned ON, and the location pressed on the location/load detection unit 100a is detected. For the detection of this pressure location, a conventional method for location detection on a touch panel may be used. In FIG. 4(B), the state in which the location/load detection unit 100a is ON is indicated by the region where the pressure-load judgment value becomes P1. In other words, the load P1 is a pressure load with a value that is greater than zero but does not satisfy the prescribed threshold value (Pth).

If an object of a file or a folder is displayed at the location on the display unit 30 corresponding to the location where pressure was detected and the location/load detection unit 100a turned ON, this object can be handled as in a hold state. In this manner, in the present embodiment, if a pressure load (P1) that is greater than zero but does not satisfy the prescribed threshold value Pth is detected on the touch panel at a location corresponding to the location of the display unit 30 where the object of the file or folder is displayed, the control unit 20 puts the object of the file or folder in a hold (selected) state. The process of detecting a pressure load on the touch panel corresponding to the location of the object and holding (selecting) the object is hereinafter referred to as "specifying" the object.

In this state, when there is external pressure with a stronger pressing force, the transparent film configuring the layer on the lower side of the location/load detection unit 100a, which is the first touch panel, sags (is strained), and presses the transparent film configuring the layer on the upper side of the location/load detection unit 100b, which is the second touch panel. If the transparent film configuring the layer on the upper side and the transparent film or transparent glass configuring the lower layer of the location/load detection unit 100b comes into contact due to this pressure, the location/load detection unit 100b, which is the second touch panel, turns ON. In FIG. 4(B), the state in which the location/load detection unit 100a is ON and the location/load detection unit 100b is also ON is shown as the region where the pressure-load judgment value becomes P2. In other words, the load P2 is a pressure load with a value exceeding the threshold value Pth.

In the present embodiment, if a pressure load (P2) satisfying the prescribed threshold value (Pth) is detected on the touch panel at a location corresponding to a location on the display unit 30 where the object of a file or folder is displayed, the object of the file or folder is "executed". Here, "executing" the object of a file means, for example, executing (launching) an application if the file is an application, or if the file is a data file, "executing" the object means executing (launching) an application that is associated with the file and is necessary for executing the file. "Executing"

the object of a folder means actions for opening the folder (i.e., to displaying other folders and/or files included in the hierarchy immediately below the folder).

Next, an object movement process according to the present embodiment is described. The following description uses an example of a touch panel configured with the separate members of the location detection unit 40 and the load detection unit 50, as shown in FIG. 3 (A). When a pressing input caused by the finger of the user is detected on the touch panel, the location detection unit 40 detects the pressure location on the display unit 30, and the load detection unit 50 detects the load of the pressure on the display unit 30. For the load detected by the load detection unit 50, a prescribed threshold value Pth for executing the specified object is set in advance.

Figure 5:
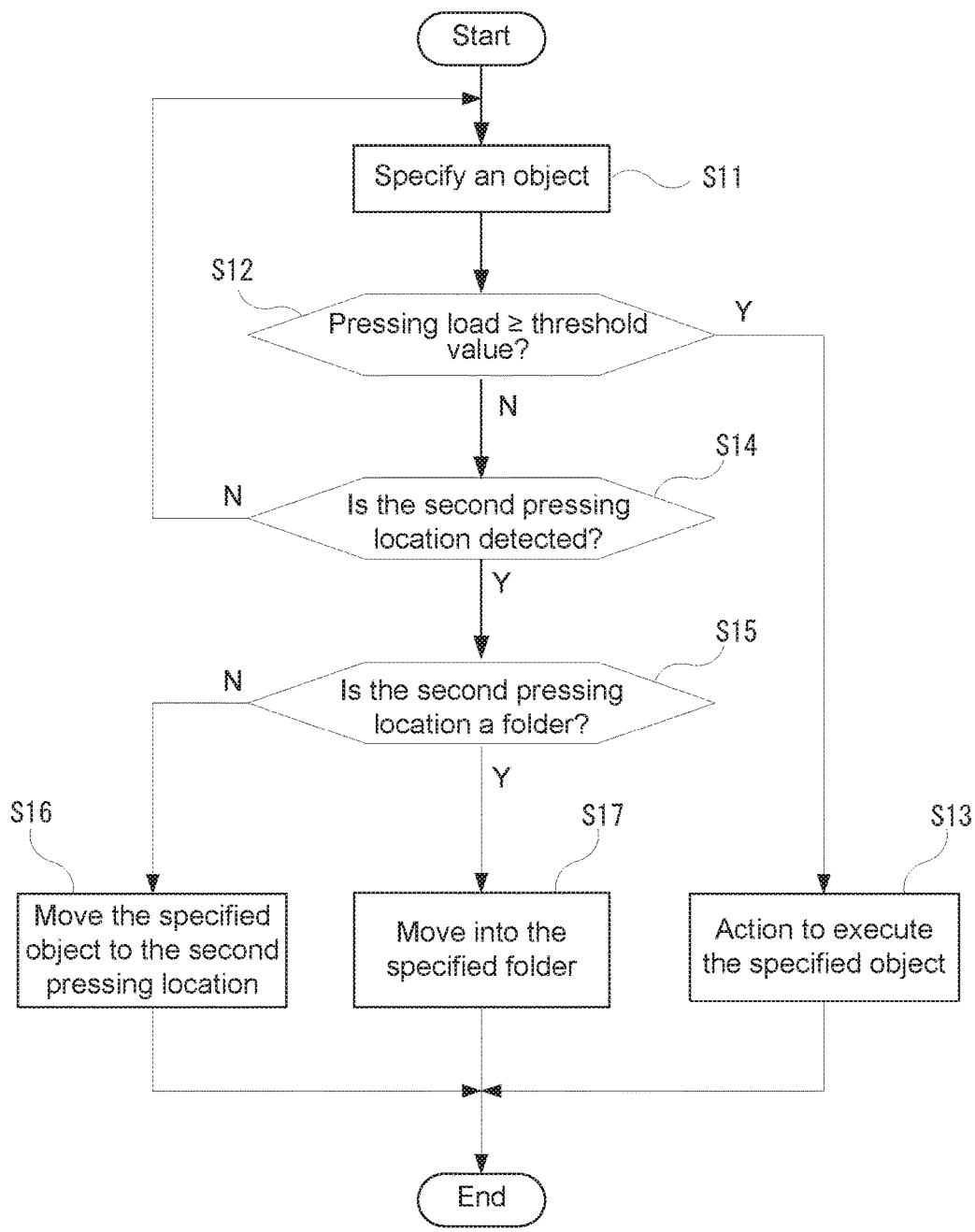
FIG. 5 is a flow diagram showing a movement process of an object according to the first embodiment.

FIG. 5 is a flow diagram showing the object movement process according to the present embodiment. In the present embodiment, the control unit 20 of the mobile terminal 10 constantly monitors external pressing inputs on the touch panel caused by the finger of the user. When an external pressing input is made on the touch panel by the finger of the user, the location detection unit 40 notifies the control unit 20 of the location of the input caused by the detected pressure. Upon receiving this notification, the control unit 20 determines whether the pressure location detected by the location detection unit 40 corresponds to the location of the object of a folder or file displayed on the display unit 30.

In the results of this determination, if the location detected by the location detection unit 40 does not correspond to the location of an object such as a folder or file displayed on the display unit 30 for receiving a pressing input, it is assumed that the input was not a pressing input intended by the user, and the control unit 20 therefore does not perform any corresponding process. On the other hand, if the results of the determination show that the location detected by the location detection unit 40 corresponds to the location of the object of a folder or file displayed on the display unit 30, the control unit 20 starts the object movement process of the present embodiment in accordance with the flow diagram of FIG. 5. In the following description, at least one object of a folder or file is displayed on the display unit 30.

When the object movement process according to the present embodiment starts, the control unit 20 first performs a process to "specify", as described above, the object of the folder or file displayed on the display unit 30 that corresponds to the location detected by the location detection unit 40 (Step S11). Here, to make the specification of the object visible to the user, the control unit 20 preferably performs a process to change the color of the specified object.

Figure 6:
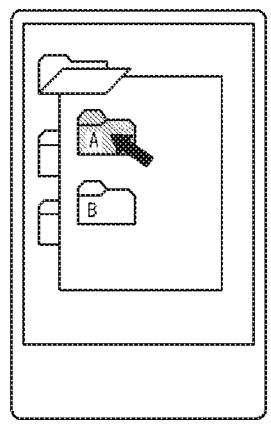
FIG. 6 is a diagram illustrating an action based on a process according to the first embodiment.
Figure 6:
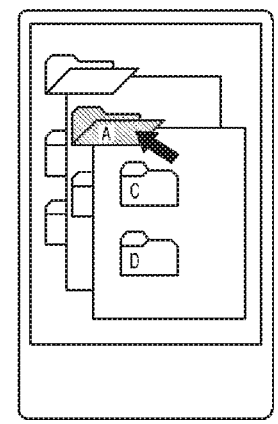
Figure 6:
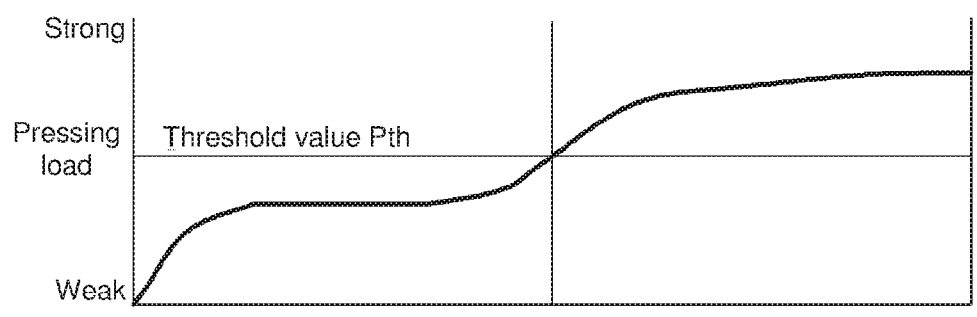

FIG. 6(*a*) shows an example in which the object of a folder has been specified. For example, by changing the color of the specified object in a manner similar to the "Folder A" shown in FIG. 6(*a*), the user is able to instantly acknowledge that the object has been specified. The black arrow shown in the diagram indicates the location pressed by the finger of the user.

When the object has been specified in Step S11, the control unit 20 determines whether the load of the pressure on the display unit 30 detected by the load detection unit 50 satisfies the prescribed threshold value Pth (Step S12). In Step S12, if the load detected by the load detection unit 50 satisfies the prescribed threshold value Pth, the control unit 20 performs a process to execute the object (Step S13). In the object execution process of Step S13, the control unit 20 executes the process associated with the object. In other words, if the object is a folder, the control unit 20 performs a process to open the folder and displays other folders and/or files included in the hierarchy immediately below the folder. On the other hand, if the object is a file, the control unit 20 performs a process to execute the file. If the file is an application, for example, a process to execute (launch) the application is performed, and if the file is a data file, a process to execute (launch) an application that is associated with the file and is necessary to execute the file is performed.

FIG. 6 is a diagram showing an example of a display on the display unit 30 of a mobile terminal 10 in which processes have been performed in accordance with the steps S11, S12 and then S13 described above. FIG. 6(*a*) shows a state in which the object of Folder A has been specified, and FIG. 6(*b*) shows a state in which the object of specified Folder A has been executed and Folder C and Folder D included in the hierarchy immediately below Folder A are displayed. Under the exemplary display of each screen, the conditions before and after the load detected by the load detection unit 50 satisfies the prescribed threshold value Pth are shown as a graph. The state in which the pressure load is greater than zero but does not satisfy the threshold value Pth is shown as "State 1", and in this state, the object specification process is performed. The state in which the pressure load gradually increases and satisfies the threshold value Pth is shown as "State 2", and in this state, the object execution process is performed.

On the other hand, in Step S12, if the load detected by the load detection unit 50 does not satisfy the prescribed Pth, the control unit 20 determines whether a pressing input corresponding to a location different from the location where the specified object is displayed is detected by the location detection unit 40 (Step S14). In other words, by defining the location corresponding to the location of the already specified object as a first pressed location, the location detection unit 40 determines whether a second pressed location different from the first pressed location is detected.

In Step S14, if a location (hereinafter, referred as second pressure location) different from the location (hereinafter, referred as first pressure location) corresponding to the location where the specified object is displayed is not detected by the location detection unit 40, the control unit 20 returns to Step S11 and continues the process. In Step S14, if a second pressure location different from the first pressure location is detected by the location detection unit 40, the control unit 20 determines whether the object of a folder is displayed at the location corresponding to the second pressure location on the display unit 30 (Step S15).

In Step S15, if the object of a folder is not displayed at the location corresponding to the second pressure location on the display unit 30, the control unit 20 implements control to move the object displayed at the first pressure location to the location corresponding to the second pressure location on the display unit 30 (Step S16).

By performing such processes, the user is able to move the object of a folder to a second location by pressing a second location on the display unit 30 where the object of the folder is not displayed, while pressing the object of the folder. Consequently, after first specifying the object, the user is able to move the object more accurately and quickly by using the mobile terminal 10 than by performing a drag operation in which the load is prone to variation.

Figure 7:
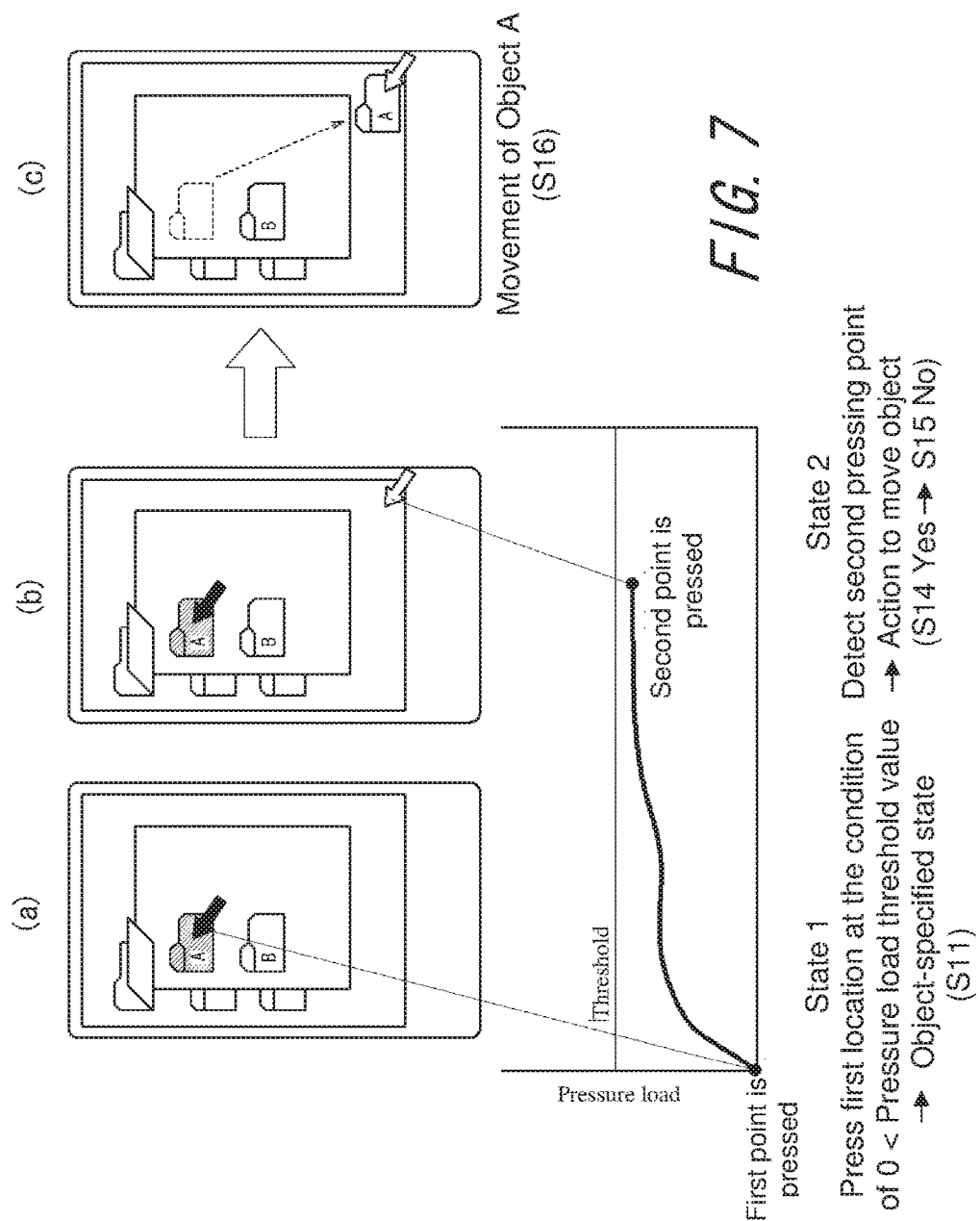
FIG. 7 is a diagram illustrating an action based on a process according to the first embodiment.

FIG. 7 is a diagram showing an example of a display of the display unit 30 of the mobile terminal 10, when the processes from Step S11 to "Yes" in Step S14 and then to "No" in Step S15 as described above are performed. Below the display examples of the respective screens of FIGS. 7(*a*) and (*b*), the temporal changes of the load detected by the load detection unit 50 are shown in a graph.

FIG. 7(a) shows a state in which the object of Folder A has been specified. Here, the load of the pressure is greater than zero but does not satisfy Pth, and this state is shown as "State 1". In this state, a process to specify the object of Folder A is performed. FIG. 7(b) shows the moment when, while specifying the object of Folder A, a location separate from the location of the object of Folder A has been pressed by the finger of the user, and the state subsequent to this moment is shown as "State 2". The white arrow indicates the second pressure location where the object of a folder is not displayed. In State 2 as well, the load of the pressure is greater than zero but does not satisfy the threshold value Pth. In the present embodiment, when a location separate from the location of the object of Folder A is pressed by the finger of the user as shown in FIG. 7(b), the specified object of Folder A is moved to the second location pressed afterward as shown in FIG. 7(c).

Figure 8:
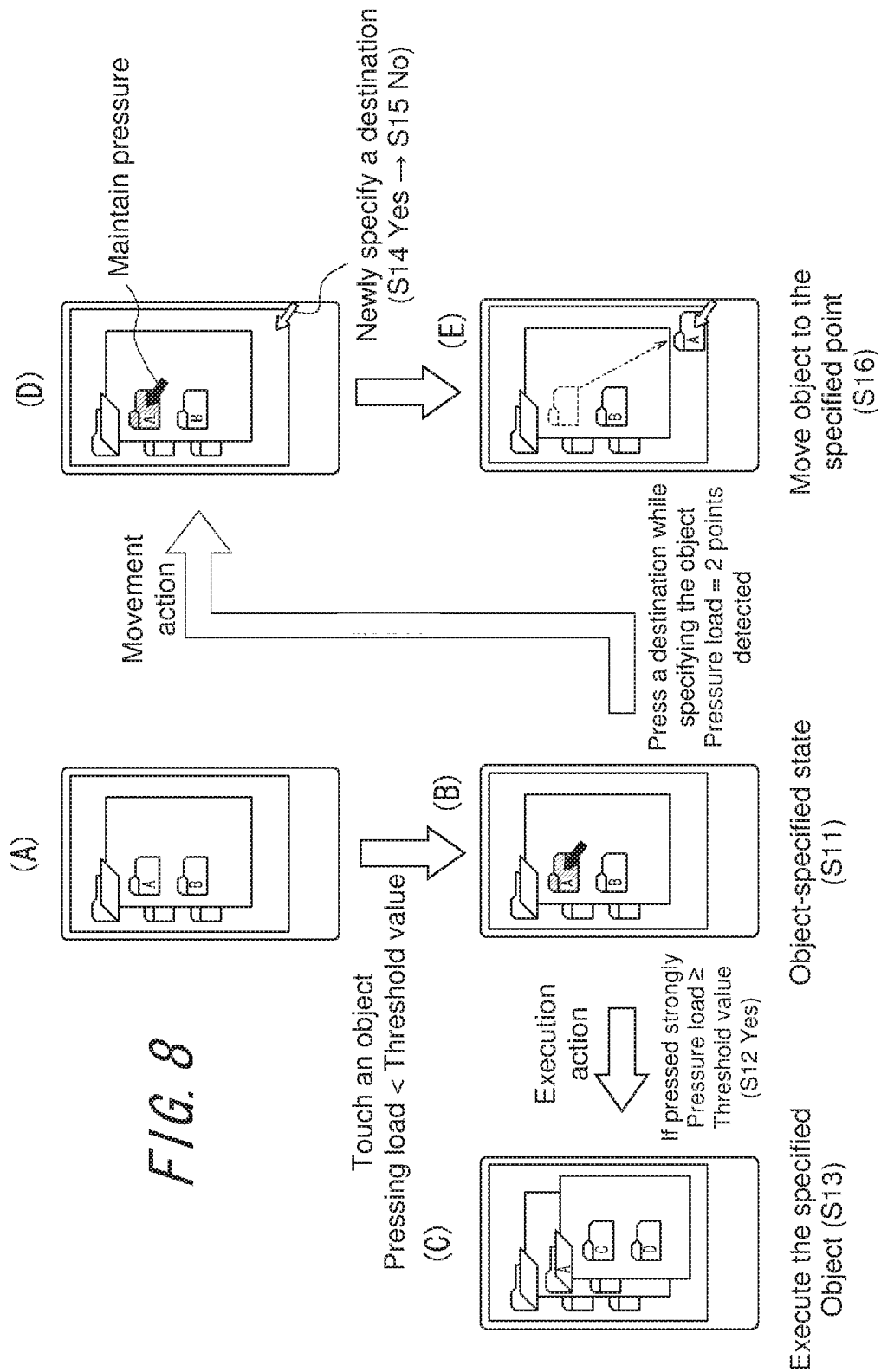
FIG. 8 is a diagram illustrating an action based on a process according to the first embodiment.

FIG. 8 is a diagram summarizing each process shown in FIGS. 6 and 7. The processes shown in FIG. 6 that perform object specification to object execution are performed in the order of FIG. 8(A), FIG. 8(B) and FIG. 8(C). FIG. 8(A) is a diagram showing a state in which a pressing input is not performed yet on the touch panel. In addition, the processes, shown in FIG. 7, of performing object specification to performing object movement are processes performed in the order of FIG. 8(A), FIG. 8(B), FIG. 8(C), FIG. 8(D) and FIG. 8(E).

If a second pressure location is detected in Step S14 and the object of a folder is displayed at the location corresponding to the second pressure location on the display unit 30 in Step S15, the control unit 20 performs the process of Step S17. In Step S17, the control unit 20 controls the display unit 30 to move the object displayed at the location corresponding to the first pressure location on the display unit 30 to a hierarchy below the folder that is the object displayed at the location corresponding to the second pressure location (second point of pressure) on the display unit 30. In this case, the object (first object) at the location pressed first is inserted (stored) in the object (second object) of the folder at the location pressed second. In this case, after the first object is moved to the location of the second object, as a display on the display unit 30, the control unit 20 may control to perform a display deleting the first object, for example. Alternatively, at this time, the control unit 20 may, in addition to deleting the first object, control the display unit 30 to change the shape or color of the second object to indicate that content is added to the second object.

FIG. 9 is a diagram showing an example of a display in the display unit 30 of the mobile terminal 10, in a case in which the process of Step S17 is performed after Step S11 to "Yes" in Step S14 and then to "Yes" in Step S15 as described above. FIG. 9(B) shows the same situation as in FIG. 8(B) and shows a state in which the object of Folder A is specified by a first point of pressure. In the example shown in FIG. 9(B), Folder B and File F are included in the same hierarchy as Folder A. FIG. 9(F) shows a state in which a second point of pressure is made on Folder B while maintaining the first point of pressure on Folder A. In the present embodiment, if a folder is present at the location of the second point of pressure, Folder A, which is already specified by the first point of pressure, is moved into Folder B, which is pressed second, as shown in FIG. 9(G).

According to the present embodiment, by making a second point of pressure at another location while specifying an object displayed on the touch panel with a first point of pressure, the user is able to move the object located at the first point of pressure to the second point of pressure without performing a drag operation. If the object is to be executed instead of being moved, the user can very easily execute the object by pressing onto the touch panel strongly (with a pressure load satisfying the prescribed threshold value Pth).

When performing operations such as those described above, a user can move an object quickly with using only one hand pressing two points instead of using a finger of one hand pressing the first point and a finger of the other hand pressing the second point. In other words, by the user's familiarity with the operations of the mobile terminal 10, the user can, while pressing one point with a finger (such as index finger) of one hand, quickly move an object by pressing a second point using another finger (such as third finger) of the same hand.

(Second Embodiment)

The following is a description of a mobile terminal, which is one example of an object display device, according to a second embodiment of the present embodiment. In the mobile terminal of the second embodiment, further functions are added to the mobile terminal 10 described in the first embodiment. The second embodiment may be implemented with the same configuration as in the mobile terminal 10, because the implementation is made by changing the control of the control unit 20 in the mobile terminal 10. Consequently, descriptions identical to those for the first embodiment are omitted. In the above-mentioned first embodiment, an object can be moved accurately and promptly without using a drag operation. In the second embodiment, an object switching process in which, without performing a drag process, two objects can be accurately and swiftly moved to switch locations.

FIG. 10 is a flow diagram showing an object movement process including an object switching process. In the flow diagram of FIG. 10, some of the processes after Step S14 in the flow diagram described in FIG. 5 are changed. Consequently, the processes from Step S11 to Step S14 are the same as those described in the first embodiment. When an object corresponding to the first pressure location is specified (Step S11), the load does not satisfy the threshold value Pth ("No" in Step S12) in the second embodiment, and a second pressure location different from the first pressure location is detected by the pressure detection unit 40 ("Yes" in Step S14), the process moves to Step S21. Hereinafter, an object displayed on the display unit 30 at a location corresponding to the first pressure location is simply described as "first object."

In Step S21, the control unit 20 determines whether an object is displayed at the location corresponding to the second pressure location on the display unit 30. In Step S21, if an object is not displayed at the location corresponding to the second pressure location on the display unit 30, a process identical to that of Step S16 described in the first embodiment is performed. In other words, in this case, the control unit 20 implements a control to move the first object to the location corresponding to the second pressure location on the display unit 30 (Step S16).

On the other hand, in Step S21, if there is an object displayed at the location corresponding to the second pressure location on the display unit 30, the control unit 20 determines whether the object is the object of a folder (Step S22). Hereinafter, an object displayed on the display unit 30 at a location corresponding to the second pressure location is simply described as "second object." In Step S22, if the second object is the object of a folder, a process identical to that of Step S17 described in the first embodiment is performed. In this case, the control unit 20 controls the display unit 30 to move the first object to a hierarchy below the folder of the second object (Step S17).

In Step S22, if the second object is not the object of a folder, the control unit 20 moves to the process of Step S23. Here, the phrase "if the second object is not the object of a folder" refers, for example, to a case in which the object of an application or a data file that is not a folder is displayed at the location corresponding to the second pressure location on the display unit 30. In Step S23, the control unit 20 controls the display unit 30 to switch and display the first object and the second object.

In this manner, in the present embodiment, while specifying an object displayed on the touch panel with a first point of pressure, by making a second point of pressure on the object of a file that is not a folder, the user can instantly switch the locations of the objects.

FIG. 11 is a diagram showing an example of a display on in the display unit 30 of the mobile terminal 10 in a case in which an object movement process according to the second embodiment is performed. In FIG. 11, the object switching process according to the second embodiment is shown together with the process described in the first embodiment for moving an object into a folder. Consequently, the processes shown in the order of FIG. 11(B), FIG. 11(F) and FIG. 11 (G) are the same as the processes shown in the order of FIG. 9(B), FIG. 9(F) and FIG. 9(G).

In the flow diagram of FIG. 10, if an object is present at the location that the user pressed second ("Yes" in Step S21) and the object is a folder ("Yes" in Step S22), the object at the location pressed first is moved inside the folder at the location pressed second (Step S17). The flow of this process is shown in FIG. 11 in the order of FIG. 11(B), FIG. 11(F) and FIG. 11(G).

An object switching process according to the second embodiment is shown in FIG. 11 in the order of FIG. 11(B), FIG. 11(H) and FIG. 11(I). FIG. 11(B) shows a state in which the object of Folder A is specified by the user's pressing a first point. In this example, Folder B and File F are included in the same hierarchy as Folder A. FIG. 11(H) shows a state in which, while maintaining the first point of pressure on Folder A, a second point of pressure is made on File F. In this manner, in the present embodiment, if an object of a file that is not a folder is present at the location pressed second, the respective locations of Folder A, which is first specified by the first point of pressure, and File F, which is pressed second, are switched as shown in FIG. 11(I).

In this manner, in the present embodiment, while specifying an object displayed on the touch panel with a first point of pressure, by making a second point of pressure on an object other than a folder, the user can accurately and swiftly switch the locations of the both objects without performing a drag process.

The present invention is not limited to the embodiments each described above, and can be modified or changed in many ways. Although it is assumed that the prescribed threshold value Pth is set in advance, for example, it is preferable to allow a user to appropriately change or adjust the value as necessary. In this way, if the user feels uncomfortable with the setting of the threshold value Pth during operation, the user can appropriately change the settings on the spot to allow natural operation.

It should be noted that in the above descriptions, the "pressure location" detected by the location detection unit 40 refers not only to "a location being pressed", but may also refer to "a location to be pressed". For example, if using a location detection unit 40 that can detect locations once the touch panel such as a capacitive touch panel is touched, the "pressure location" refers to a "location being pressed (in actuality by the user)". In this case, the state in which a pressure location is detected by the location detection unit 40 refers solely to a case in which the location detection unit 40 detects a location on the display unit that is actually being pressed. In this case, in the state in which a pressure location has been detected by the location detection unit 40 and the pressure load detected by the load detection unit 50 does not satisfy a prescribed threshold value, because the display unit 30 is actually being pressed, cases in which the load detected by the load detection unit 50 is zero are not included.

On the other hand, if the location detection unit 40 is, for example, an infrared touch panel and can detect locations even if the input unit (touch panel) is not touched, the "pressure location" refers not only to a "location being pressed (in actuality by the user)" but also a "location that the user is going to press (at this moment)". In this case, the state in which a pressure location has been detected by the location detection unit 40 does not necessarily mean that the display unit 30 (or the location detection unit 40) is actually being pressed, even if the location detection unit 40 detects a pressure location on the display unit 30. Consequently, the state in which a pressure location is detected by the location detection unit 40 and the pressure load detected by the load detection unit 50 does not satisfy a prescribed threshold value includes cases in which the display unit 30 (or the location detection unit 40) is not actually being pressed. Therefore, in the state in which a pressure location is detected by the location detection unit 40 and the pressure load detected by the load detection unit 50 does not satisfy a prescribed threshold value, cases in which the load detected by the load detection unit 50 is zero are included.

In above description, embodiments in which it can be determined that the load detected from the pressing input by the user on an object "satisfy the threshold value Pth" may include several embodiments. Generally, for example, if the load detected by the load detection unit 50 satisfies the threshold value Pth, a determination that "the threshold value Pth is satisfied" is made. However, a determination that "the threshold value Pth is satisfied" may also be made in cases in which the load exceeds the threshold value Pth. It may also be determined that "the Pth is satisfied" in cases in which a load exhibiting the threshold value Pth is detected by the load detection unit 50.

As in the above description, there is presumed to be several embodiments in which it can be determined that the load detected from the pressing input by the user on an object "does not satisfy the threshold value Pth". For example, if the load detected by the load detection unit 50 is below the threshold value Pth, it may be determined that "the Pth is not satisfied". However, a determination that "the threshold value Pth is not satisfied" may also be made in cases in which the load is equal to or less than the threshold value Pth. Furthermore, it may also be determined that "the threshold value Pth is not satisfied" in cases in which a load exhibiting the threshold value Pth is not detected by the load detection unit 50.

Although the shape of the load detection unit 50 is a frame-like shape in the above description, it is also possible to provide multiple pieces on the outer circumference of the display region of the display unit 30, or to layer and provide a plane-shaped load detection unit on the front surface of the display unit 30. Although the location detection unit 40 is layered and provided on the load detection unit 50, it is also possible to layer and provide the load detection unit 50 on the front surface of the location detection unit 40. The purpose of these units is to respectively detect pressure locations and pressure loads, and it should be noted that the structures thereof are not limited to the examples described above.

REFERENCE NUMERALS

10: mobile phone
20: control unit
30: display unit
40: location detection unit
50: load detection unit
60: storage unit
70: voice input unit
80: voice output unit
90: key input unit
100: location/load detection unit

The invention claimed is:

1. An object display device, comprising:
   a display configured to display a plurality of objects; and
   a controller communicatively coupled to a location detector and a load detector, the controller configured:
   to detect a first location, which is the location of a first pressing on a first object of the plurality of objects on the display, the first pressing having a maintained first pressing load that is maintained between a zero pressure and a threshold pressure on the object;
   to detect a second location, which is the location of a second pressing on the display;
   to move the first object to the second location only after the second pressing is detected during the maintained first pressing load when the second pressing does not exceed the threshold pressure and is in a second location that is different location than the first location;
   to not move the first object when the first pressing load exceeds the threshold pressure or when the second pressing is detected only after the maintained first pressing load is released, and
   when a second object is displayed at the second location and the second object does not correspond to a folder, to switch the first object and the second object, such that the first object is displayed in the second location and the second object is displayed in the first location.

2. The object display device of claim 1, wherein
   the controller is configured to execute the first object when the first pressing load satisfies the threshold pressure.

3. The object display device of claim 1, wherein
   the controller is configured to move the first object to the second location when the second pressing is maintained after the maintained first pressing load is released.

4. The object display device of claim 1, wherein
   the controller is configured to move the first object to a folder specified by the second location when the second location corresponds to a folder.

5. A method of controlling an object on a display device, the method comprising:
   displaying a plurality of objects on a display;
   detecting a first location, which is the location of a first pressing on a first object of the plurality of objects on the display, the first pressing having a maintained first pressing load that is maintained between a zero pressure and a threshold pressure on the object;
   detecting a second location, which is the location of a second pressing on the display;
   moving the first object to the second location only after the second pressing is detected during the maintained first pressing load when the second pressing does not exceed the threshold pressure and is in a different location than the first location;
   not moving the first object when the first pressing load exceeds the threshold pressure or when the second pressing is detected only after the maintained first pressing load is released, and
   when a second object is displayed at the second location and the second object does not correspond to a folder, switching the first object and the second object, such that the first object is displayed in the second location and the second object is displayed in the first location.

6. The method of claim 5, further comprising
   executing the first object when the first pressing load satisfies the threshold pressure.

7. The method of claim 5, further comprising
   moving the first object to the second location when the second pressing is maintained after the maintained first pressing load is released.

8. The method of claim 5, further comprising
   moving the first object to a folder specified by the second location when the second location corresponds to a folder.

* * * * *